(12) United States Patent
Thoms

(10) Patent No.: US 8,063,392 B2
(45) Date of Patent: Nov. 22, 2011

(54) DEVICE FOR READING OUT EXPOSED IMAGING PLATE CASSETTES

(76) Inventor: Michael Thoms, Bietigheim-Bissingen (DE)

( * ) Notice: Subject to any disclaimer, the term of this patent is extended or adjusted under 35 U.S.C. 154(b) by 313 days.

(21) Appl. No.: 11/992,630

(22) PCT Filed: Aug. 23, 2006

(86) PCT No.: PCT/EP2006/008261
§ 371 (c)(1),
(2), (4) Date: Apr. 20, 2009

(87) PCT Pub. No.: WO2007/036269
PCT Pub. Date: Apr. 5, 2007

(65) Prior Publication Data
US 2009/0267006 A1 Oct. 29, 2009

(30) Foreign Application Priority Data
Sep. 27, 2005 (DE) .......................... 10 2005 046 315

(51) Int. Cl.
*G01N 23/04* (2006.01)

(52) U.S. Cl. ........................................ 250/589; 250/584

(58) Field of Classification Search ............... 250/484.4, 250/581, 584, 586, 588, 589, 590
See application file for complete search history.

(56) References Cited

U.S. PATENT DOCUMENTS

| | | | |
|---|---|---|---|
| 4,960,994 A | 10/1990 | Muller et al. | |
| 2002/0148988 A1 | 10/2002 | Thoms | |
| 2004/0164252 A1 | 8/2004 | Yonekawa | |

FOREIGN PATENT DOCUMENTS

| | | |
|---|---|---|
| DE | 37 31 204 A1 | 3/1989 |
| DE | 199 42 211 C2 | 4/2001 |
| JP | 2005-202293 A | 7/2005 |
| WO | WO 01/18796 A1 | 3/2001 |

OTHER PUBLICATIONS

International Search Report of PCT/EP2006/008261 consisting of 4 pages.

*Primary Examiner* — Mark R Gaworecki
(74) *Attorney, Agent, or Firm* — Factor & Lake, Ltd.

(57) ABSTRACT

The invention relates to a readout device for exposed imaging plates. The inventive device is characterized in that the exposed plates are transported while lying in cassettes. A drive device moves the cassettes across a read gap at a constant speed and is configured as a wheel and disk drive acting upon the cassette rear.

28 Claims, 11 Drawing Sheets

DEVICE FOR READING OUT EXPOSED IMAGING PLATE CASSETTES

RELATED APPLICATIONS

This application claims the filing benefit of PCT Patent Application No. PCT/EP2006/008261, filed Aug. 23, 2006; which claims the benefit of German Patent Application No. 10 2005 046 315.0, filed Sep. 27, 2005; the contents of all are incorporated herein by reference.

TECHNICAL FIELD

The invention relates to a device for reading out exposed imaging plates, with a readout head that generates a readout beam that is moved in a first scanning direction and exhibits detection means for fluorescent light emitted from the imaging plate in the course of readout, and with a feed device which moves the imaging plate in a second scanning direction inclined in relation to the first scanning direction, wherein the imaging plate is arranged in a cassette and in that the drive device exhibits a drive part which engages the cassette in non-positive manner.

The invention relates to a device for reading out exposed imaging plates, according to the precharacterising portion of Claim 1.

BACKGROUND OF THE INVENTION

A device of such a type is described in WO 01/18796 A1.

Imaging plates, which store a latent image in the form of excited local states of colour centres, are suitable—unlike X-ray films—for frequent re-use. For the resolution of the imaging plates, it is important that the active working layer, which contain the storage centres (as a rule, rare earths in an alkaline-earth or alkali mixed-crystal matrix) in homogeneously distributed manner and which are optically highly isotropic, preserve their optical isotropy even during relatively long use. Scratches and stress marks result in an impairment of the X-ray image.

The problem of protecting imaging plates from mechanical damage of such a type even in continuous use is to be solved by the present invention.

The present invention is directed to address these and other issues.

SUMMARY OF THE INVENTION

In accordance with the present invention, this object may be achieved by means of a readout device for reading out exposed imaging plates, with a readout head that generates a readout beam that is moved in a first scanning direction and exhibits detection means for fluorescent light emitted from the imaging plate in the course of readout, and with a feed device which moves the imaging plate in a second scanning direction inclined in relation to the first scanning direction, characterised in that the imaging plate is arranged in a cassette and in that the drive device exhibits a drive part which engages the cassette in non-positive manner.

In accordance with the invention, this object is achieved by means of a readout device having the features specified in Claim 1.

Together with such a readout device, cassettes for the imaging plates are used that have been produced from a substantially rigid material which is responsible for the guidance of the imaging plate and for the transmission of the driving forces. The imaging plate does not itself need to support either guidance functions or drive functions.

Wear marks on the cassettes that are generated by guidance and propulsion, on the other hand, are tolerable and do not impair the operation of the imaging plate.

When the readout device is a drum scanner, as a rule the imaging plates are arranged in partially cylindrical configuration, retained in the imaging plate. This is guaranteed by appropriate contouring of two halves of the cassette, which for the purpose of inserting an imaging plate are moved away from one another and are then moved together again.

The dish-shaped cassette is open towards one side in such a manner that the light-sensitive working layer of an imaging plate can be read out freely. For the purpose of receiving the X-ray light and for the purpose of transporting the exposed cassette to the readout device, this side of the cassette is sealed by a light-shielding cover.

Said light-shielding cover is then taken off the readout device before the actual readout operation takes place.

These and other objects and advantages will be made apparent from the following brief description of the drawings and the detailed description of the invention.

DETAILED DESCRIPTION OF THE PRESENT INVENTION

Figure 1:
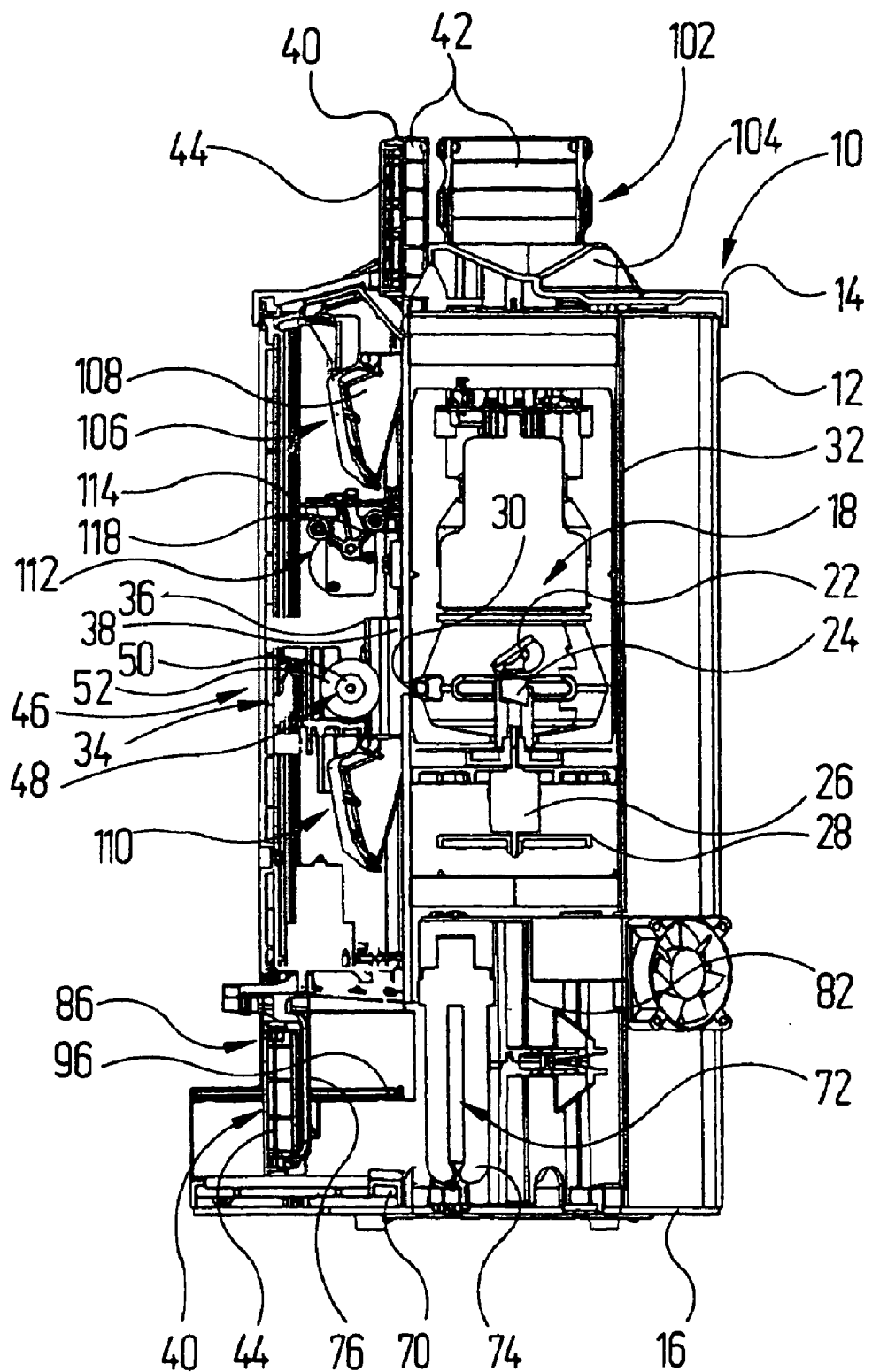
FIG. 1 shows a vertical axial section through a device for reading out exposed imaging plates, said device also being provided with an integrated erasing unit.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
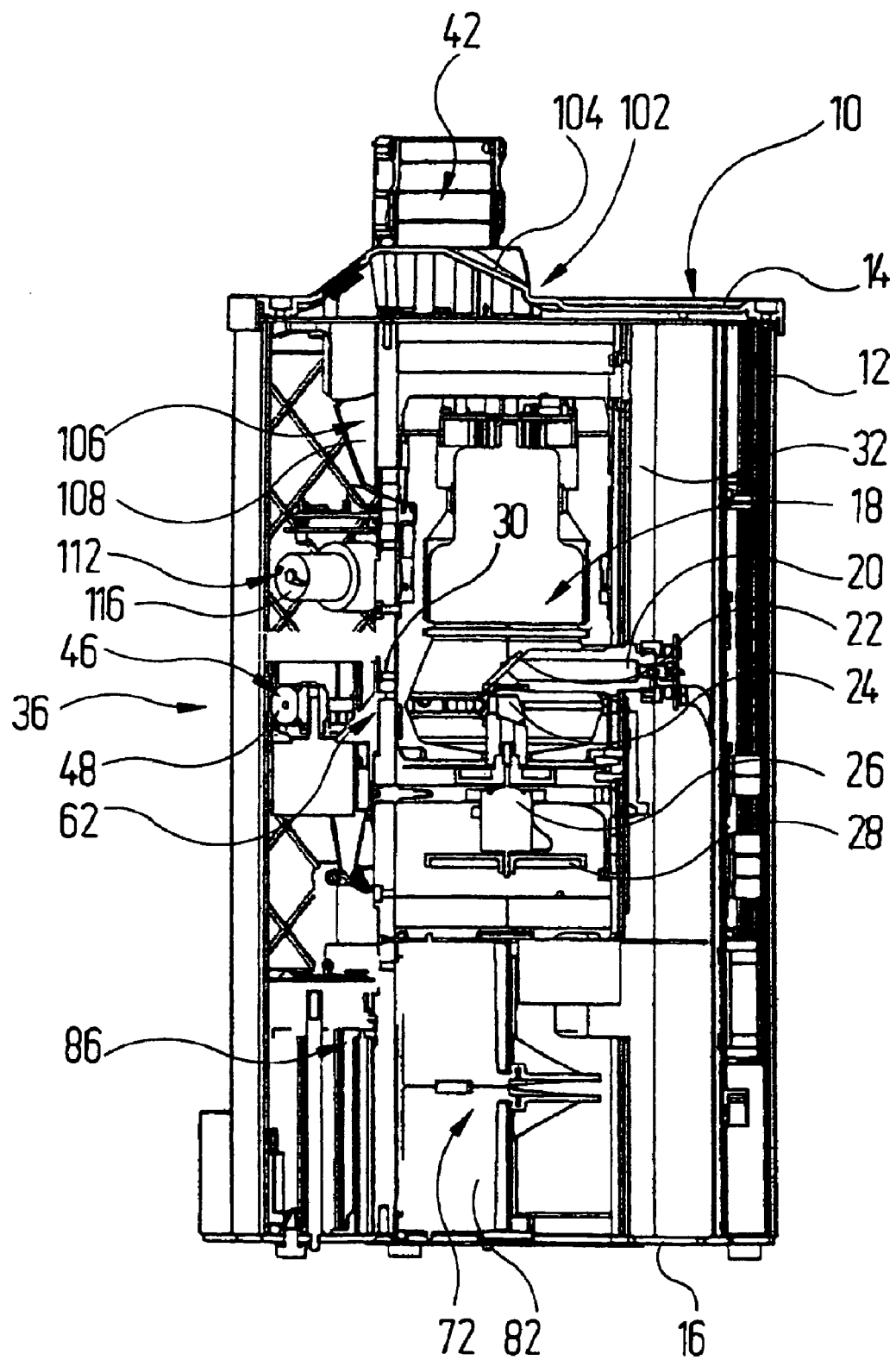
FIG. 2 a section similar to FIG. 1, which, however, lies in an intersecting plane that is offset by 45° in relation to the plane of the drawing of FIG. 1.
Figure 3:
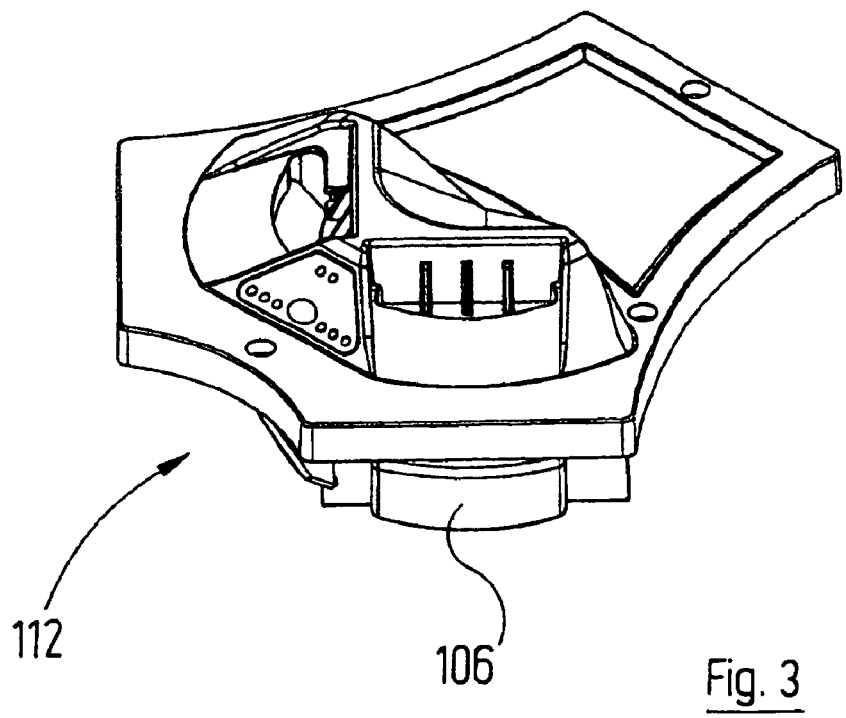
FIG. 3 a top view of a segregation station adjoining the cassette inlet of the device, in front of which a queue of exposed cassettes is able to build up from which one cassette is then passed on in each instance to the actual readout unit.
Figure 4:
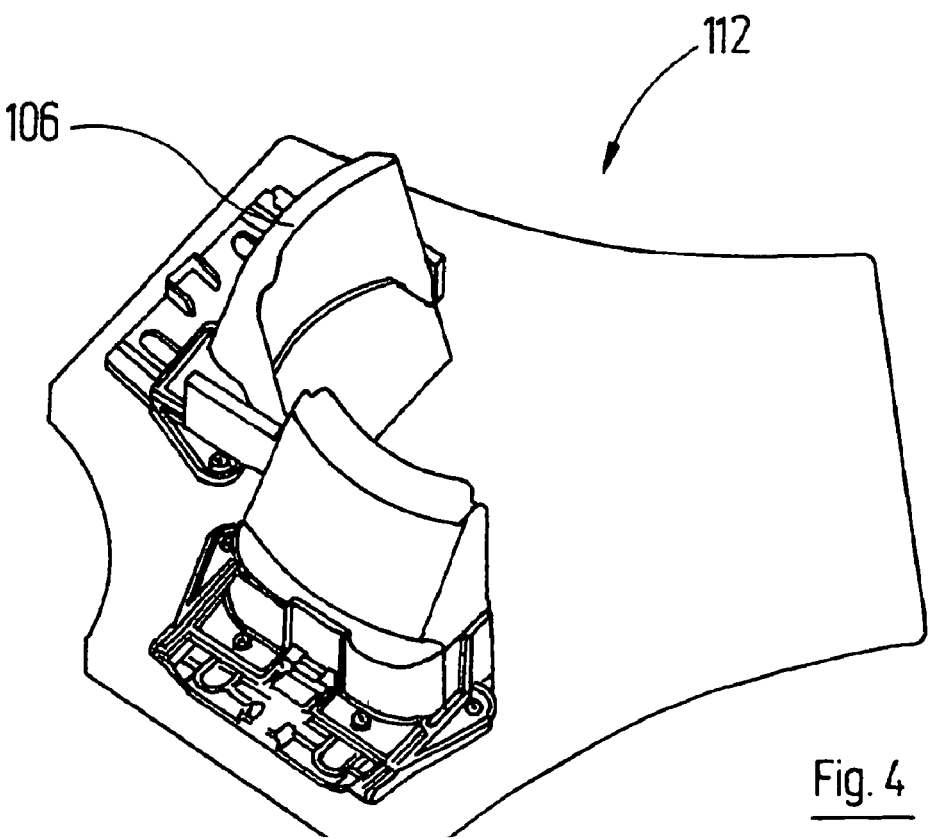
FIG. 4 a top view of the underside of the segregation station shown in FIG. 3.
Figure 5:
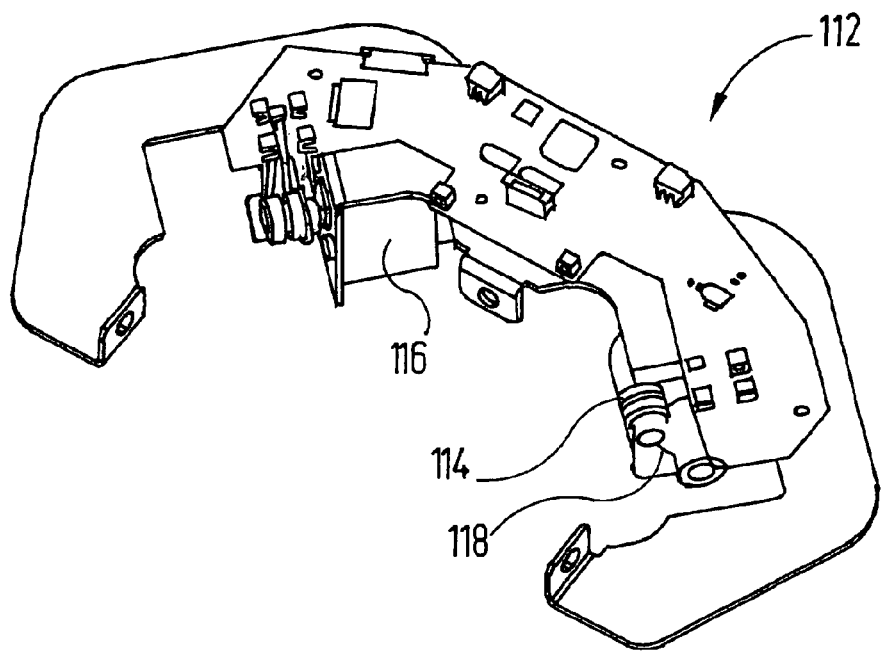
FIG. 5 a top view of the mechanism of the segregation station shown in FIGS. 3 and 4.
Figure 6:
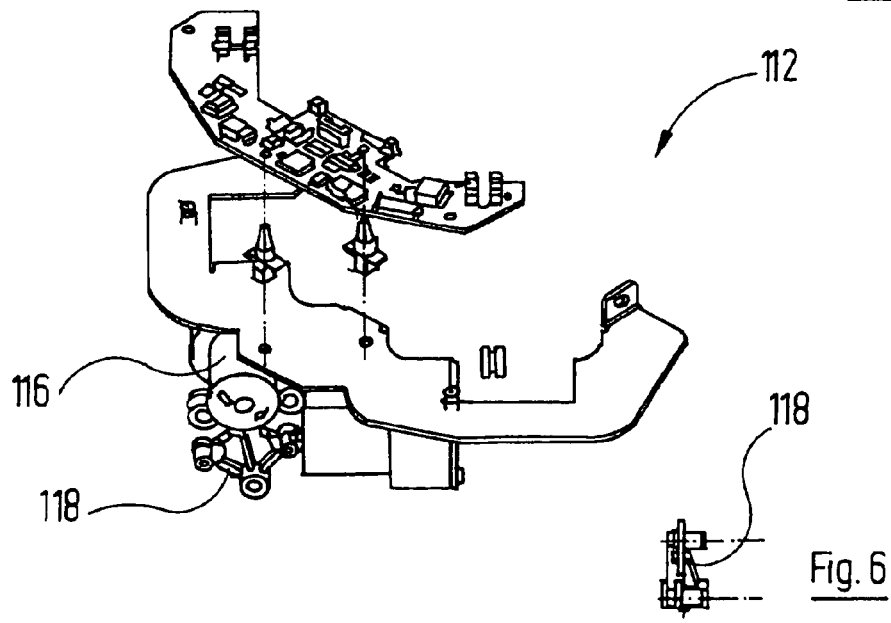
FIG. 6 an exploded top view of the mechanism of the segregation station seen in FIG. 5, from above to the right.
Figure 7:
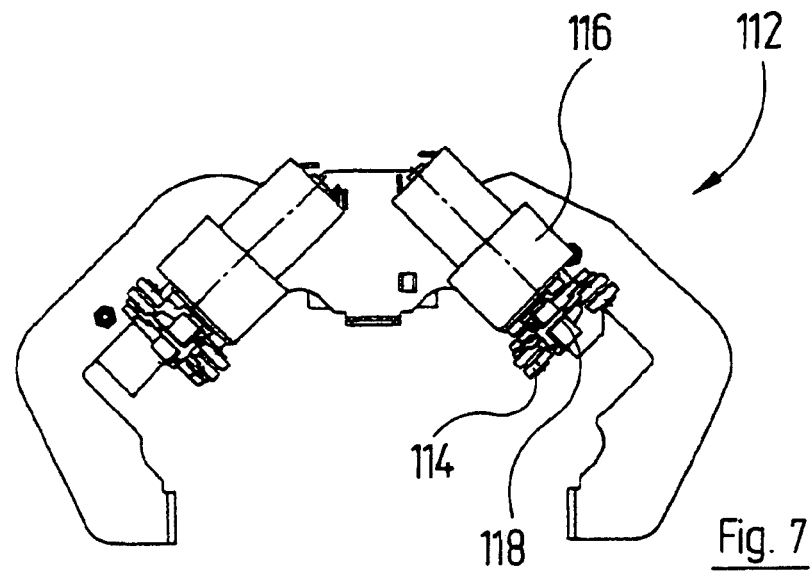
FIG. 7 a further top view of the underside of the segregation station.
Figure 8:
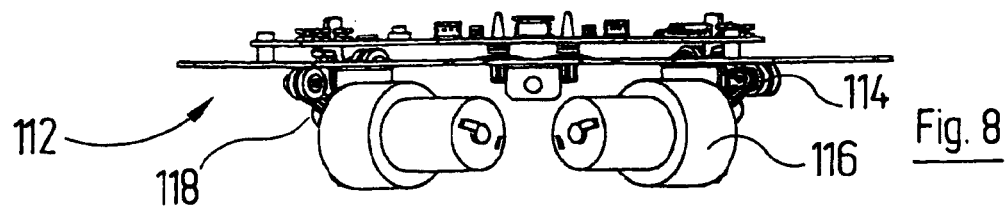
FIG. 8 a lateral view of the segregation station.
Figure 9:
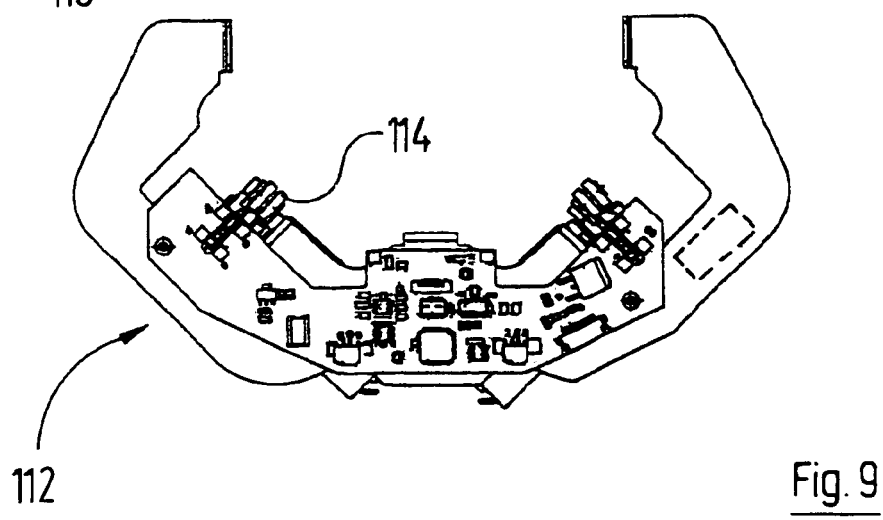
FIG. 9 a further top view of the upper side of the segregation station.

The device for reading out exposed imaging plates that is shown in FIGS. 1 and 2 has a housing which is denoted overall by 10, with a cylindrical peripheral wall 12, a substantially circular cover 14 and a likewise substantially circular bottom 16.

On the axis of the housing 10 a readout head is provided which is denoted overall by 18. Said readout head includes a laser 20 which is visible in FIG. 2, which is horizontally aligned, and which sends its laser beam onto the axis of rotation of a peripheral pentaprism 24 via a 45° mirror 22. Said pentaprism is driven by a motor 26, the speed of which is stabilised by a flywheel 28.

In this way, a readout beam constituted by laser light is obtained which revolves in a transverse plane and emerges outwards through two readout slots 30 of a readout-head housing 32, which extend in the peripheral direction and are offset by 90°. The readout-head housing 32 is cylindrical.

In front of the readout slots 30 two readout stations 34 are provided which are likewise offset by 90° in the peripheral direction. Said readout stations each include a guide 36 mounted onto the outside of the readout-head housing 32, said guides being provided with guide slots 38 which interact with the narrow faces of cassettes 40 as reproduced in an initial position on the upper side of the device.

The cassettes 40 have the form of flat rectangular dishes that are open on one side. Mounted onto the open sides of the cassettes 40 are light-shielding covers 42. The light-shielding covers 42 interact with the cassette 40 via a sliding guide which is vertical in FIG. 1 and which is open on one side (in FIG. 1, downwardly). For the purpose of recording an X-ray image on an imaging plate 44 which is arranged inside the cassette 40 and only indicated schematically, the light-shielding covers 42 are located on the cassette itself.

The cassette 40 has bearing surfaces in its interior, by which the imaging plate 44 are bent into partially cylindrical geometry. The radius of curvature of these bearing surfaces corresponds to the radius of curvature of a circle, concentric with the axis of the readout head 18, with a spacing as exhibited by the middle imaging plate 44 in the readout station 34.

For the purpose of moving the imaging plate 44 past the readout slot 30, a friction-wheel drive is provided which is denoted overall by 46. Said friction-wheel drive includes a friction wheel 48 which is capable of rotating about a horizontal axis extending in the peripheral direction and which exhibits a metallic rim 50 and a relatively thick tyre 52 made of elastomeric material. The entire arrangement is such that the tyre 52 runs under slight compression on the rear of a cassette 40 when the latter is moved past the readout slot 30 in the guide 36.

Figure 10:
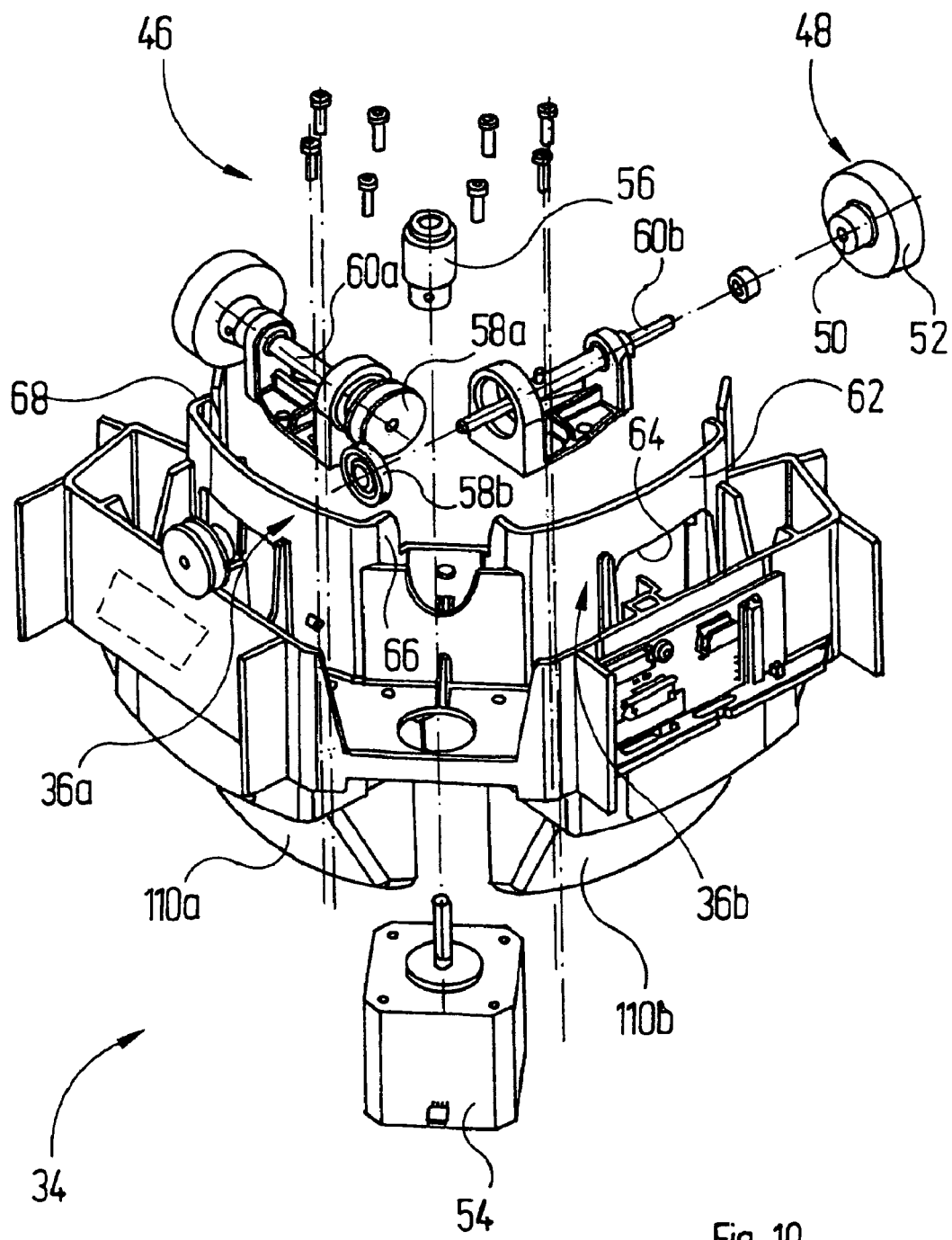
FIG. 10 an exploded representation of a drive device with which the cassettes are moved across a readout gap of a readout head of the device.
Figure 11:
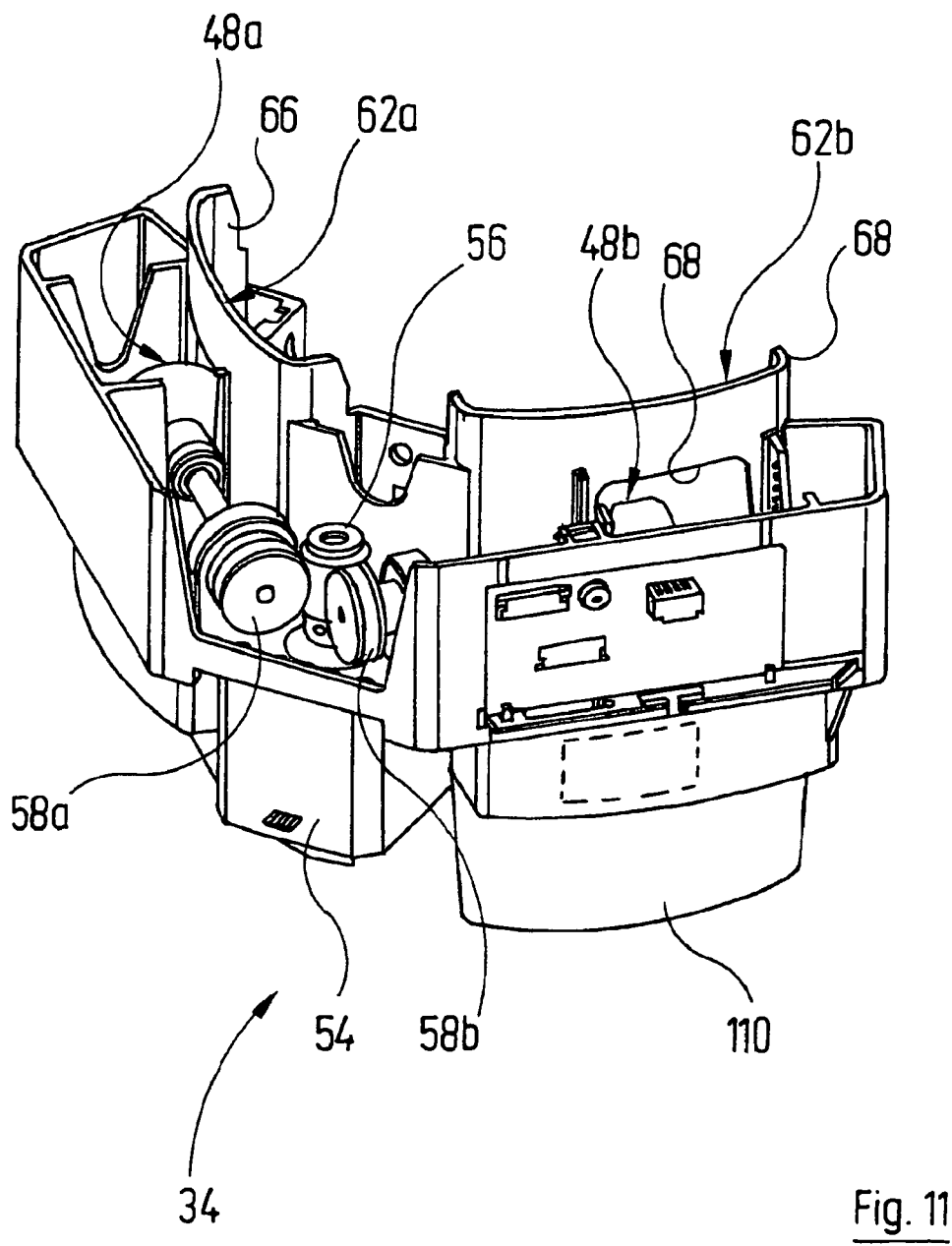
FIG. 11 a view similar to FIG. 10, in which the drive device is shown in the assembled state.

The two readout stations 34 which are offset in the peripheral direction are driven by a common drive motor 54 which is shown in FIG. 10. On the shaft of the drive motor 54 a worm wheel 56 is seated which meshes with two gear wheels 58a, 58b which are provided on gear shafts 60a, 60b of the two readout stations 34a, 34b.

Only one of the two readout stations needs to be described in detail below. To the extent that components are to be distinguished from one another, this is done by suffixing 'a' or 'b'.

The readout station 34 on the guide 36 has, in each instance, an external partially cylindrical wall 62 in which a window 64 is provided, through which a friction wheel 48 is able to pass. The shape of the wall 62 has been adapted to the rear of a cassette 40 (see FIG. 15).

The guide 36 further has two radial guidance walls 66, 68, perpendicular to the wall 62, which are able to interact with opposing lateral faces of a cassette 40.

As is evident from FIG. 1, the friction wheels 48 are arranged in such a way that a cassette that has been moved downwards is released from the friction wheel being considered only when the imaging plate arranged in it has gone completely past the readout slot 30.

After this release, the cassette falls freely downwards.

On this downward path the underside of the cassette then impinges on a pad 70 made of elastomeric material. It is then located, with the working layer of the imaging plate pointing inwards, in front of an erasing unit denoted overall by 72, which in the course of the readout of the latent image in the readout station 34 serves to completely deactivate storage centres not yet deactivated by irradiation with erasing light.

By way of erasing-light source, in the exemplary embodiment being considered a fluorescent lamp 74 is used such as is commercially available in the form of an energy-saving lamp. Use is preferably made of a fluorescent lamp that emits a warm light with a relatively large red component. Alternatively, special fluorescent lamps can be used, the glass tube of which has been coated with a luminescent material (red phosphor) emitting in the red.

While a cassette 40 was falling down from the readout station 34 to the erasing station 72, a slide 76, which exhibits a large passage window 78 and a frame 80 which is only narrow and which is situated at the edge of said passage window, was spaced radially inwards from the falling path of the cassette 40.

The slide 76 is provided with a drive mechanism which is not shown in any detail in FIG. 1, and in this way it is able to move a cassette 40 positioned in front of it after the erasure to the left in FIG. 1 to a delivery opening in the device.

Figure 12:
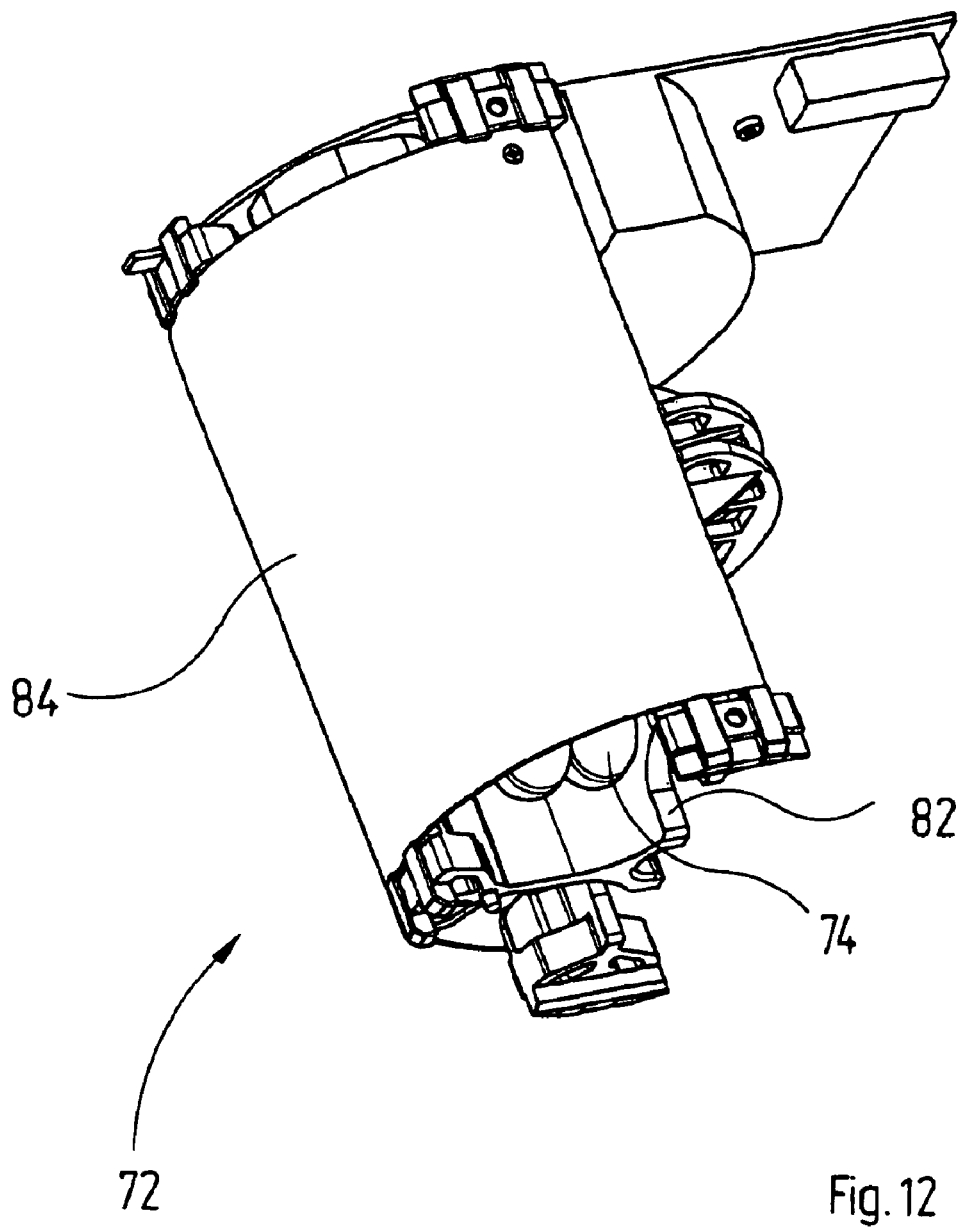
FIG. 12 a perspective view of an erasing station provided in the lower section of the device for erasing remnants of the image that has been read out.

As is evident from FIG. 12, the erasing station 72 includes a housing 82 in which the fluorescent lamp 74 is accommodated. It further includes a semicylindrical large cut-off filter 84 which is transmitting starting from a wavelength of approximately 480 nm.

Figure 13:
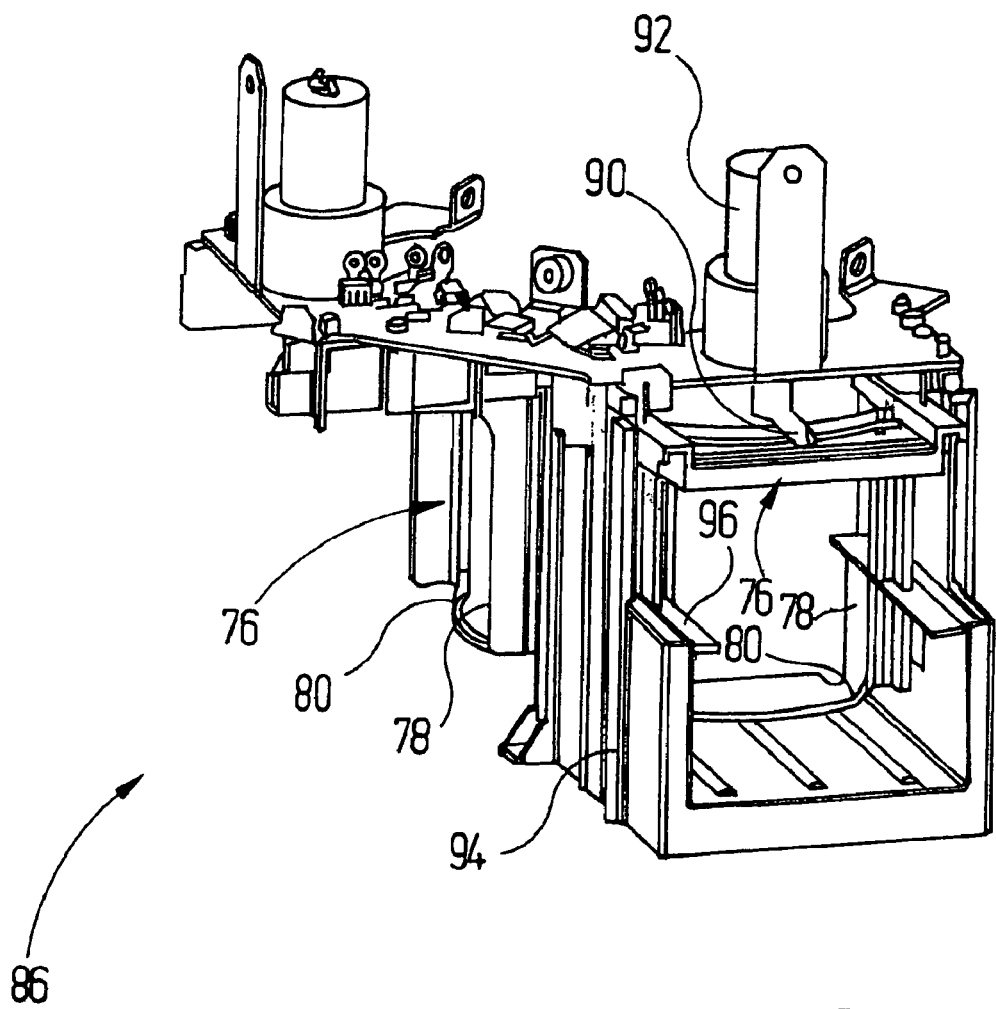
FIG. 13 a perspective view of a cassette-ejection station which is provided at the lower end of the device.
Figure 14:
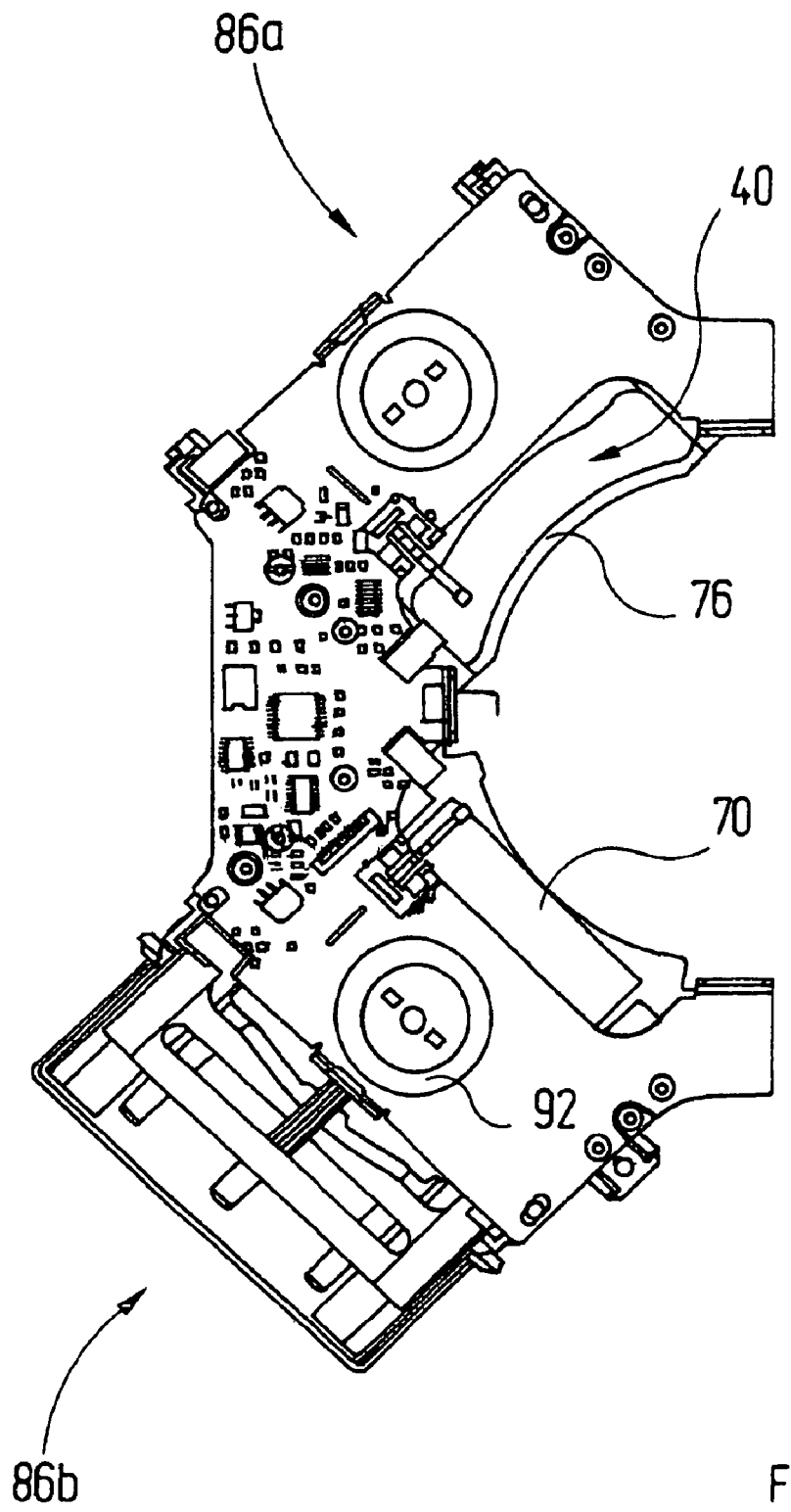
FIG. 14 a top view of the ejection station.

Particulars of an ejection unit denoted overall by 86, to which the slide 76 pertains, can be gathered from FIGS. 13 and 14.

This unit is again of dual construction in a manner similar to the drive unit of the readout station 34. In FIG. 13 the rear ejection unit has only been partially reproduced.

It will be discerned that the slide 76 runs on a guide and is moved by a rotatable lever 90 which is seated on the output shaft of a motor 92.

The drives for the two slides 76 are independent of one another, in order to be able to operate in both readout channels of the device with independent cycle times.

In order to stabilise the cassette 40 inside a shaft 94 which leads to the outlet of the device, the walls of this shaft are provided with horizontal brush rows 96 which interact with the side walls of the cassette.

The two ejection units 76 are connected, just like the two readout stations 34 and the two segregation stations, to a one-piece manageable unit by means of a connecting wall.

As is evident from FIG. 14, the slide 76 is convexly partially cylindrical in its outer face and matches the concavely partially cylindrical inner face of the edge of the window of a cassette which is situated a short distance in front of the light-sensitive working layer of an imaging plate located in the cassette.

In this connection, see the upper ejection station in FIG. 14, in which the slide 76 is shown moved fully radially inwards and a cassette 40 is located in front of said slide, whereas in the case of the lower ejection station in FIG. 14 the slide 76 has been moved radially outwards, so that the pad 70 is visible.

At the output of the shaft 94, a station which is not reproduced in the drawing may be provided, in which a light-shielding cover 42 is again pushed onto the erased cassette. But after the ejection of a cassette this pushing-on may also simply take place manually under daylight conditions, since daylight does not influence colour centres that have not yet been excited.

On the cover 14 of the housing 10 two insertion stations 102 are provided. These each have an insertion aid 104 which is able to securely position and grip a cassette with pushed-on light-shielding cover at the lower end.

The insertion aids 104 are configured in such a way that the cassette 40 comes to be situated above an upper introduction slot of the device while the light-shielding cover is firmly supported. The latter consequently carries the cassette 40 via the light-tight guide. If a vertical pressure is now exerted on said cassette, it is pushed downwards by the light-shielding cover and gets into the interior of the housing 10, where it falls downwards under the influence of gravity.

The falling path is covered by a guiding and covering cap 106 exhibiting a wedge-shaped vertical cross-section, which is sealed in the peripheral direction by means of end walls 108.

A similar guiding and covering flap is shown at 110 below the readout station 34.

Figure 15:
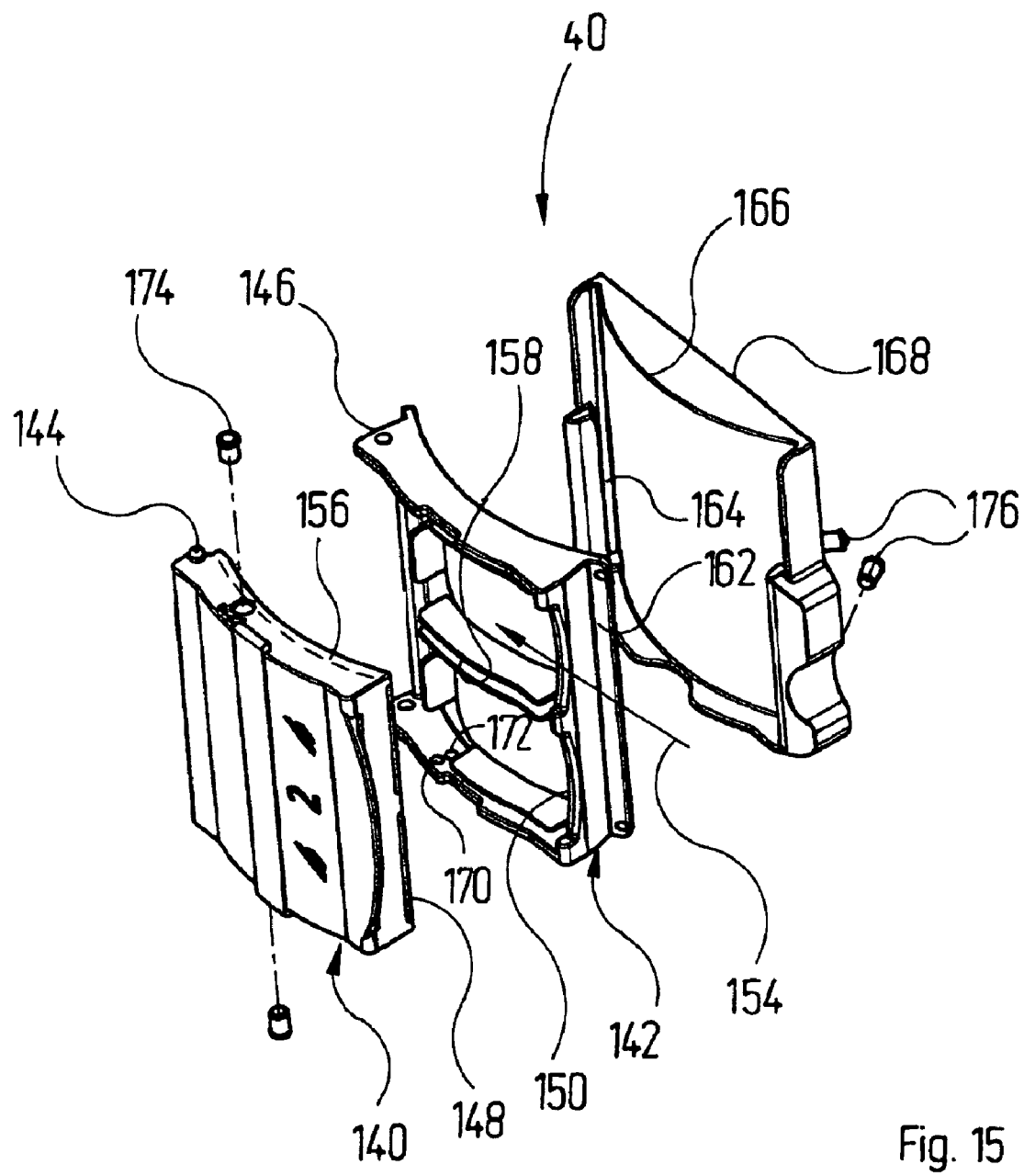
FIG. 15 an exploded representation of an imaging-plate cassette that is used with a readout device according to FIGS. 1 to 14.

As is evident from FIG. 15, the cassette 40 includes two cassette parts 140, 142 which are pivotably connected via joint pins 144 of the cassette part 140 and bearing bores 146 of the cassette part 142.

Two flat rectangular recesses 148 in the cassette part 140 and two flat arcuate recesses 150 in the cassette part 142 together predetermine a plate-introduction opening 152 in each instance.

The cassette part 140 has a partially cylindrical bottom 154 which in the readout device is coaxial with the axis of the readout head 18. The same holds for an internal abutment face 156 of the cassette part 140, which is set back by the depth of the recesses 148 from the radially internal edge of the cassette part 140.

Arcuate pressing webs 158 of the cassette part 142, which interact with the edges of the imaging plate and which in the readout device likewise extend coaxially in relation to the axis of the readout head 18, serve for positive pressing of a flexible imaging plate 42 onto the curved abutment face 156.

The cassette part 142 takes the form of a frame that is open on both sides and at its sides has guide flanges 162 which interact with guide slots 164 in a light-shielding cover 42.

The light-shielding cover 42 has a covering wall 166 which is complementary to the internal side of the cassette part 142 and which is able to seal the inside of the cassette part 142 in light-tight manner.

If desired, a flat external wall 168 may also be provided in front of the covering wall if the unit consisting of cassette and mounted light-shielding cover is to have a plane principal face.

The light-shielding cover 42 is manufactured from a material that is transmitting in respect of X-rays but opaque in respect of visible light.

Detent openings 172, 174 in the cassette part 142 serve together with matching detent pins of the cassette part 140 (not visible in FIG. 15) for the interlocking of the two cassette parts in a closing position, in which the two imaging plates are firmly fixed in partially cylindrical geometry, and in an easily opened position, in which imaging plates can be inserted and removed.

Denoted by 164 and 176 are spherical detent units which are able to interlock the two cassette parts 140, 142 or the cassette 40 and the light-shielding cover 42.

The device may also include a segregation station 112 which may be provided upstream of the drive device 46 (when viewed in a plate conveying direction). The segregation station may include at least one braking body 114 which is capable of being shifted between a cassette-release position and a cassette-braking position. In an embodiment, the braking body 114 may be arranged on a lever 118 which is capable of being rotated by a motor 116.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A device for reading out exposed imaging plates, comprising:
 a readout head which generates a readout beam which is moved in a first scanning direction and exhibits detection means for fluorescent light emitted from an imaging plate in the course of readout;
 a drive device which moves the imaging plate in a second scanning direction inclined in relation to the first scanning direction; and,
 wherein the imaging plate is arranged in a cassette and in that the drive device exhibits a drive part which engages the cassette in non-positive manner; and,
 wherein the drive device exhibits a guide with guide slots which interact with narrow faces of the cassette.

2. The device of claim 1, wherein the material pairing of the guide and the cassette exhibits low coefficient of friction.

3. The device of claim 1, wherein the drive device includes a friction wheel.

4. The device of claim 3, wherein the friction wheel engages the rear of the cassette.

5. The device of claim 4, wherein the friction wheel exhibits a tyre made of elastomeric material.

6. The device of claim 5, wherein a material pairing consisting of the elastomeric material of the tyre and a material of the cassette has a high coefficient of friction.

7. The device of claim 5, wherein a thickness of the elastomeric tyre amounts to approximately one to three times a thickness of the cassette.

8. The device of claim 1, further including several drive devices which are spaced in a direction parallel to the first scanning direction.

9. The device of claim 8, wherein a majority of drive devices are driven by a common drive motor via a distributor transmission.

10. The device of claim 1, wherein a trajectory of the cassette extends substantially vertically.

11. The device of claim 1, wherein the drive device has a plate-output side and exhibits a covering and guiding flap on the plate-output side.

12. The device of claim 1, further comprising a wall surrounding the readout head is cylindrical.

13. The device of claim 1, further comprising a cassette-segregation station provided upstream of the drive device, viewed in a plate-conveying direction.

14. The device of claim 13, wherein the segregation station exhibits at least one braking body which is capable of being shifted between a cassette-release position and a cassette-braking position.

15. The device of claim 14, wherein the braking body takes the form of a wheel.

16. The device of claim 14, wherein the braking body is arranged on a lever which is capable of being rotated by a motor.

17. The device of claim 16, further comprising several drive devices, wherein for each drive device a segregation station is provided, and in each instance is in alignment in the plate-conveying direction.

18. The device of claim 17, wherein the segregation stations exhibit independent drives for their braking bodies.

19. The device of claim 14, further comprising a covering and guiding body provided upstream of the segregation station, viewed in the plate-conveying direction.

20. The device of claim 19, wherein the covering and guiding body exhibits the shape of a hood with wedge-shaped cross-section.

21. The device of claim 1, for use with cassettes which interact with a cover sealing their open end, further comprising a cover-removing device arranged upstream of the drive device in a plate-conveying direction for separating the cover and the cassette.

22. The device of claim 21, wherein the cover interacts with the cassette in light-tight manner via a slide guide.

23. The device of claim 21, wherein a guidance direction of the cover-removing device and a guidance direction of the drive device coincide.

24. The device of claim 21, further comprising a plate-erasing station provided downstream of the drive device, viewed in the plate-conveying direction.

25. The device of claim 24, wherein the plate-erasing station exhibits by way of light-source a fluorescent lamp, a broadband light-source, or a narrowband light-source.

26. The device of claim 1, further comprising a station for ejecting cassettes that have been read out provided downstream of the drive device, viewed in a plate-conveying direction.

27. The device of claim 26, wherein the ejection station exhibits a slide which is capable of being moved between a waiting position, in which it is remote from the cassette-conveying path, into an ejection position, in which a cassette moved thereby is accessible from the outside of the device.

28. The device of claim 1, further comprising a cover-mounting station provided at a cassette outlet of the device.

* * * * *